United States Patent
Kumpfmueller

(10) Patent No.: US 6,530,277 B2
(45) Date of Patent: Mar. 11, 2003

(54) DIAGNOSTIC SYSTEM FOR A VALVE THAT CAN BE ACTUATED BY A POSITION CONTROLLER VIA A DRIVE

(75) Inventor: Hans-Georg Kumpfmueller, Gleiszellen-Gleishorbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/993,714

(22) Filed: Nov. 27, 2001

(65) Prior Publication Data

US 2002/0062682 A1 May 30, 2002

Related U.S. Application Data

(63) Continuation of application No. PCT/DE00/01711, filed on May 26, 2000.

(30) Foreign Application Priority Data

May 27, 1999 (DE) .......................................... 199 24 377

(51) Int. Cl.$^7$ .............................................. G01N 29/00
(52) U.S. Cl. ............................... 73/592; 73/47; 73/168; 73/659
(58) Field of Search .......................... 73/592, 168, 659, 73/1.01, 660, 593, 40.5 A, 45.4, 47; 324/73.1

(56) References Cited

U.S. PATENT DOCUMENTS

| | | | | |
|---|---|---|---|---|
| 4,429,578 A | * | 2/1984 | Darrel et al. ................. | 73/659 |
| 4,896,101 A | | 1/1990 | Cobb ......................... | 324/73.1 |
| 4,965,513 A | * | 10/1990 | Haynes et al. ................ | 73/659 |
| 5,115,672 A | * | 5/1992 | McShane et al. ............. | 73/596 |
| 5,159,835 A | * | 11/1992 | Nafziger et al. .............. | 73/584 |
| 5,228,342 A | * | 7/1993 | McShane ..................... | 73/597 |
| 5,251,148 A | * | 10/1993 | Haines et al. ................ | 700/282 |
| 5,475,299 A | * | 12/1995 | Leon .......................... | 73/168 |
| 5,524,484 A | * | 6/1996 | Sullivan ...................... | 73/168 |
| 5,616,824 A | * | 4/1997 | Abdel-Malek et al. ........ | 73/1.01 |
| 5,616,829 A | | 4/1997 | Balaschak et al. ............ | 73/46 |
| 6,289,723 B1 | * | 9/2001 | Leon .......................... | 73/49.8 |
| 6,289,735 B1 | * | 9/2001 | Dister et al. ................. | 73/579 |

FOREIGN PATENT DOCUMENTS

| | | | | |
|---|---|---|---|---|
| DE | 222 962 A1 | 5/1985 | ............ | G01M/7/00 |
| DE | 232 965 A1 | 2/1986 | ............ | F16K/37/00 |
| DE | 43 26 343 A1 | 2/1995 | ............ | G01D/21/00 |
| EP | 0 637 713 A1 | 2/1995 | ............ | F16K/37/00 |
| JP | 56014672 | 2/1981 | ............ | F16K/37/00 |
| JP | 01213539 | 8/1989 | ............ | F16K/37/00 |

OTHER PUBLICATIONS

Weisshapt, Bruno, "Vom Schalter zum Sensor", in TR TRANSFER Nr. 18, 1994, pp. 14 –16.

\* cited by examiner

*Primary Examiner*—Hezron Williams
*Assistant Examiner*—Jacques Saint-Surin
(74) *Attorney, Agent, or Firm*—Sughrue Mion, PLLC

(57) ABSTRACT

A diagnostic system for a valve (2) that can be actuated by a position controller via a drive. The diagnostic system includes a device (14) provided for recording, storing, and evaluating, body sound spectra on the valve. In order to enable a valve to be diagnosed in a particularly reliable manner, a body sound spectrum which is recorded when the intact valve (2) is slightly open is stored in the device (14) provided for recording, storing, and evaluating, whereby the valve can be closed for diagnostic purposes and the resemblance of the recorded body sound spectrum to the stored body sound spectrum is used as a criterion for evaluating a non-sealing condition of the valve.

15 Claims, 1 Drawing Sheet

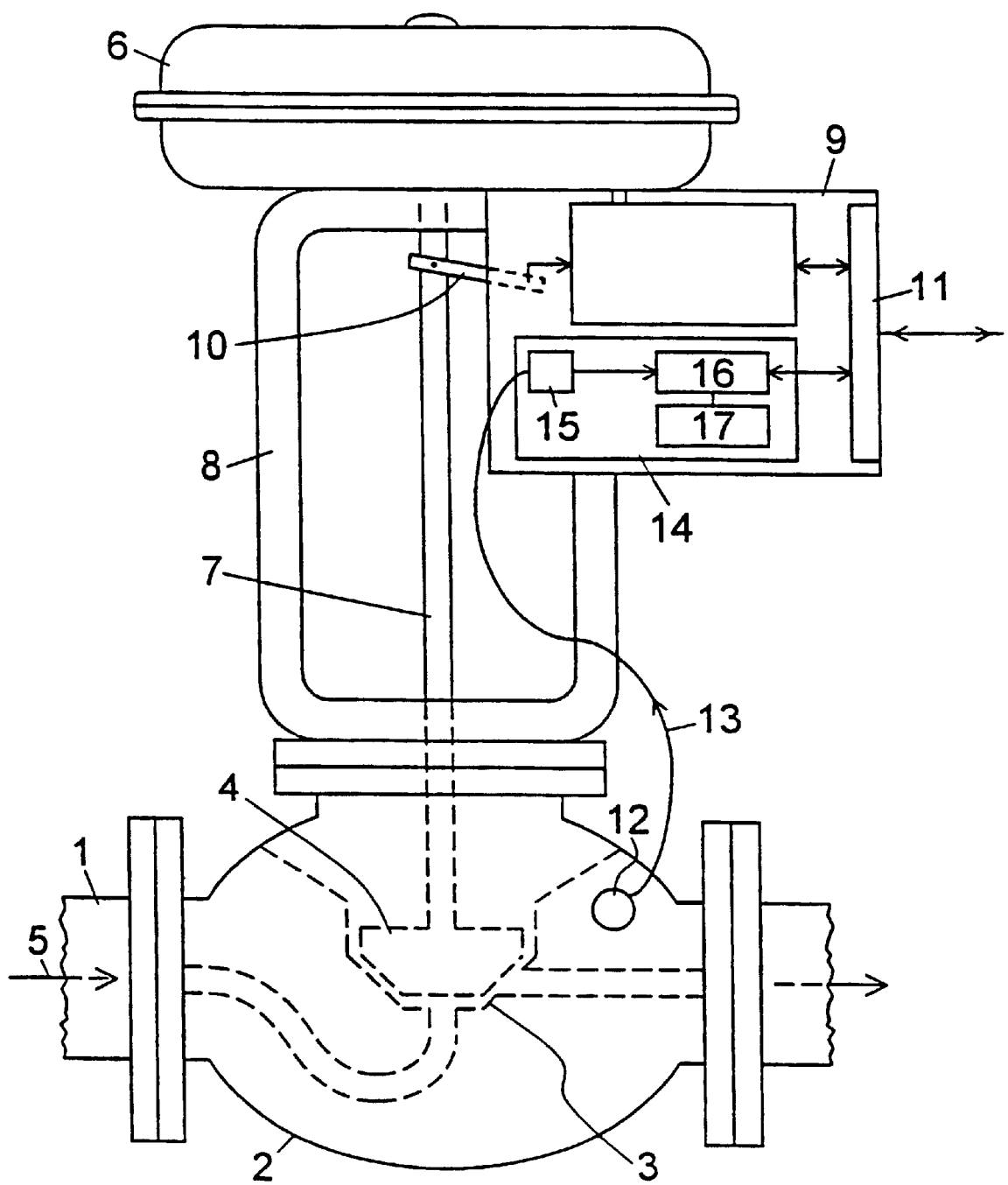

DIAGNOSTIC SYSTEM FOR A VALVE THAT CAN BE ACTUATED BY A POSITION CONTROLLER VIA A DRIVE

This is a Continuation of International Application PCT/DE00/01711, with an international filing date of May 26, 2000, which was published under PCT Article 21(2) in German, and the complete disclosure of which, including amendments, is incorporated into this application by reference.

FIELD OF AND BACKGROUND OF THE INVENTION

The invention relates to a diagnostic system for a valve that can be actuated by a position controller via a drive with a device for recording, storing, and evaluating, structure-born noise spectra on the valve. The invention also relates to a method for diagnosing the state of a valve.

In such a diagnostic system, known from European Patent EP 0 637 713 A1, a structure-borne noise sensor, the signal of which is supplied to a device for recording and storing structure-born noise spectra, is mounted to the housing of the valve. In an intact valve and a defective valve, there are different characteristics of the vibration level over a certain frequency. By forming the surface integral, and defining an acceptable deviation, it is possible to detect a defective valve. In particular, it is possible to determine wear caused by corrosion, cavitation, or erosion.

OBJECTS OF THE INVENTION

One object of the invention is to permit a particularly reliable diagnosis on valves.

SUMMARY OF THE INVENTION

According to one formulation of the invention, these and other objects are solved by a diagnostic system of the initially defined type, wherein a structure-born noise spectrum, which is recorded when an intact valve is slightly open, is stored in a device for recording, storing, and evaluating. Then, the valve is closed for diagnostic purposes, and a structure-bome noise spectrum is recorded. Then, the similarity between the recorded structure-bome noise spectrum and the stored structure-bome noise spectrum is used as a criterion for evaluating valve leakage.

The structure-borne noise spectrum of defective valves depends not only on the valve itself, but also on the medium flowing through it, the pressure of this medium, and the background noise during normal operation, e.g., the noise of adjacent pumps. As a result, the structure-bome noise spectra of an intact and a defective valve cannot be determined exactly in advance. In its almost closed position, however, a valve produces a structure-borne spectrum that is very similar to a closed valve with a defective valve seat. In the diagnostic system according to the invention, the structure-bome noise spectrum that is recorded in the almost closed, or slightly open, valve and then stored is therefore used as a reference to identify the structure-bome noise spectrum of a closed valve with a defective valve seat.

Conversely, to be able to identify the structure-bome noise spectrum of a closed valve with an intact valve seat, an additional structure-bome noise spectrum that is recorded in a closed intact valve is stored in the device for recording, storing, and evaluating. The similarity between the structure-borne noise spectrum recorded in the valve closed for diagnostic purposes, and the additional stored structure-borne noise spectrum is used as a criterion for evaluating the intactness of the valve.

The different criteria for the leakage of the valve and the tightness of the valve can be linked to a valve state signal, preferably by fuzzy linkage.

Since the operational background noise that enters into the structure-borne noise spectra, e.g., pump noise, can differ depending on when the structure-borne noise spectra are recorded, it is provided that when the structure-borne noise spectrum for a defined valve position is recorded, an additional structure-borne noise spectrum in another valve position also is recorded. Then, prior to the recorded structure-borne noise spectrum being stored and/or evaluated, corresponding spectral components—between the additionally recorded structure-borne noise spectrum and the recorded structure-borne noise spectrum—are removed from the recorded structure-borne noise spectrum. The structure-borne noise spectra that are being stored, or are to be evaluated, are then essentially independent from random momentary background noise.

The device for recording, storing, and evaluating, structure-borne noise spectra is preferably an integral component of the position controller, so that the diagnosis of the valve can be prompted via the data interface of the position controller, and so that the result of the evaluation can be checked via this data interface.

BRIEF DESCRIPTION OF THE DRAWINGS

The invention and further advantageous refinements of the invention according to the features of the dependent claims are explained in more detail below with the aid of the diagrammatic, exemplary embodiment in the drawing.

DETAILED DESCRIPTION OF THE PREFERRED EMBODIMENTS

A valve 2 is installed in a pipeline 1 of a unit, which is not further depicted. This valve 2 controls the passage of a medium 5 by lifting a closing element 4 that cooperates with a valve seat 3. The closing element is lifted by a pneumatic drive 6 that is connected to the closing element 4 by means of a valve rod 7. The drive 6 is connected to the housing of the valve 2 via a yoke 8.

Mounted to yoke 8 is a position controller 9 that, on the input side, records the amount of lift via a connecting element 10 that engages with the valve rod 7.

Further, the controller 9 compares this amount of lift with a set-point value supplied via a data interface 11 and, on the output side, controls the pneumatic drive 6 in terms of a compensation of the control deviation.

Mounted to the housing of valve 2, or to parts that are directly connected therewith, is a structure-borne noise sensor 12. The signal 13 from the sensor 12 is supplied to a device 14 for recording, storing, and evaluating, structure-borne noise spectra. This device 14, in the exemplary embodiment shown, forms an integral part of the position controller 9, but can also be configured separately therefrom.

Device 14 comprises a signal conditioning circuit 15 in which the signal 13 is conditioned by being amplified, prefiltered, and digitized. In a downstream arithmetic unit 16, the structure-borne noise spectrum is determined from the conditioned signal 13, e.g., by fast Fourier transformation. This signal—depending on the requirement—can be either stored in a memory 17, or further evaluated to obtain information on the state of valve 2. Recording, storage, and evaluation, of the structure-borne noise spectra is prompted via the data interface 11, over which the result of the evaluation of the structure-borne noise spectra can also be checked.

If one can assume that the valve 2 is intact—i.e., for instance when valve 2 is first taken into operation or has been exchanged—then valve 2 is brought into a nearly closed position and the associated structure-borne noise spectrum is recorded and stored. This stored structure-borne noise spectrum is very similar to that of a closed valve that leaks, and serves to identify a state of wear of valve 2 in a subsequent diagnosis. To this end, valve 2 is brought into its closed position and the associated structure-borne spectrum is recorded. In the arithmetic unit 16, the structure-borne noise spectrum that was recorded in the closed position of valve 2 is compared with the stored structure-borne noise spectrum that was recorded for the intact valve 2 in a nearly closed position. The similarity between the two structure-borne noise spectra is a criterion for evaluating the leakage of valve 2.

The similarity of the structure-borne noise spectra that are being compared with one another may be influenced by various background noises, which are due to different operating states of the unit in which valve 2 is installed, and may have nothing to do with the state of valve 2. To reduce the influence of such background noise on the evaluation of the structure-borne noise spectra, an additional structure-borne noise spectrum in another valve position is recorded for each recording of a structure-borne noise spectrum for a defined valve position. Corresponding spectral components— between the additional structure-borne noise spectrum and the recorded structure-borne noise spectrum—are then subtracted from the recorded structure-borne noise spectrum for the defined valve position. As a result, only those spectral components that essentially depend on the valve position are left for further evaluation or storage.

To obtain a criterion for the intact state of valve 2—in addition to the aforementioned criterion for possible leakage of valve 2—valve 2 is brought into a closed position when it is first put into operation, and an additional structure-borne noise spectrum is recorded and stored. If valve 2 is later brought into the closed position for diagnostic purposes, the recorded structure-borne noise spectrum is compared with the stored additional structure-borne noise spectrum. The similarity between the two structure-borne noise spectra is used as a criterion for evaluating the intactness of valve 2.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A diagnostic system for a valve that is actuated by a position controller through a drive connected between said position controller and the valve, said system comprising:
    a device for recording, storing, and evaluating, structure-borne noise spectra of the valve,
    said device having a structure-borne noise spectrum, recorded when an intact valve is slightly open, stored therein,
        whereby the valve is closed for diagnostic purposes, a structure-borne noise spectrum is recorded, and a similarity between the recorded structure-bore noise spectrum and the stored structure-borne noise spectrum is used as a criterion for evaluating leakage of the valve.

2. The diagnostic system as claimed in claim 1, wherein an additional structure-borne noise spectrum, which is recorded when the intact valve is closed, is stored in the device,
    whereby a similarity between the recorded structure-bore noise spectrum and the stored additional structure-borne noise spectrum is used as a criterion for evaluating intactness of the valve.

3. The diagnostic system as claimed in claim 1, wherein the criteria are linked to a valve state signal.

4. The diagnostic system as claimed in claim 3, wherein the criteria are linked to a valve state signal by a fuzzy linkage.

5. The diagnostic system as claimed in claim 1, wherein when the structure-borne noise spectrum is recorded for a defined valve position, an additional structure-borne noise spectrum in a different valve position is recorded, and the structure-borne noise spectrum in the defined valve position, prior to being evaluated, has removed therefrom corresponding spectral components of the additionally recorded structure-borne noise spectrum.

6. The diagnostic system as claimed in claim 1, in combination with the position controller, wherein the device for recording, storing, and evaluating, structure-borne noise spectra is an integral component of the position controller.

7. A method for diagnosing the state of a valve, comprising:
    storing a structure-borne noise spectrum, recorded when an intact valve is slightly open, in a device for recording, storing, and evaluating, structure-borne noise spectra;
    closing the valve for diagnostic purposes, and recording a structure-borne noise spectrum;
    comparing the recorded structure-borne noise spectrum with the stored structure-borne noise spectrum; and
    utilizing a substantial similarity between the recorded structure-borne noise spectrum and the stored structure-borne noise spectrum at least as one criterion in determining whether the valve is leaking.

8. The method of diagnosing a valve as claimed in claim 7, further comprising:
    recording an additional structure-borne noise spectrum when the intact valve is closed, and storing said additional structure-borne noise spectrum in the device;
    comparing the recorded structure-borne noise spectrum and the stored additional structure-borne noise spectrum; and
    utilizing a substantial similarity between the recorded structure-borne noise spectrum and the stored additional structure-borne noise spectrum at least as one criterion in determining whether the valve is intact.

9. The method of diagnosing a valve as claimed in claim 7, further comprising:
    recording an additional structure-borne noise spectrum when the valve is in a second valve position that is different from the closed valve position;
    determining corresponding spectral components between the recorded structure-borne noise spectrum and the additionally recorded structure-borne noise spectrum; and
    removing the corresponding spectral components from the recorded structure-borne noise spectrum, wherein said step of removing is performed prior to utilizing a substantial similarity in determining whether the valve is leaking.

10. A diagnostic system for a valve, comprising:

means for recording structure-borne noise spectra;

means for storing structure-borne noise spectra, wherein said means for storing stores a first structure-borne noise spectrum recorded when an intact valve is slightly open;

means for evaluating whether a valve is intact or is leaking by comparing a structure-borne noise spectrum as recorded by said means for recording, with a structure-borne noise spectrum as stored in said means for storing, wherein said means for evaluating utilizes a substantial similarity between a structure-borne noise spectrum as recorded by said means for recording, and said first structure-borne noise spectrum stored in said means for storing, at least as one criterion for evaluating leakage of the valve.

11. The diagnostic system as claimed in claim 10, wherein said means for storing stores an additional structure-borne noise spectrum that is recorded when the intact valve is closed, and wherein said evaluating means utilizes a substantial similarity between a structure-borne noise spectrum as recorded by said means for recording, and the stored additional structure-borne noise spectrum, at least as one criterion for evaluating intactness of the valve.

12. The diagnostic system as claimed in claim 10, wherein the means for recording records a structure-borne noise spectrum for a defined valve position, and records an additional structure-borne noise spectrum in a different valve position, and wherein the means for evaluating, prior to determining whether the valve is intact or is leaking, removes from the recorded structure-borne noise spectrum corresponding spectral components of the additionally recorded structure-borne noise spectrum.

13. A diagnostic system for a valve, comprising:

a sensor disposed near a valve;

a signal conditioning circuit connected to said sensor so as to receive a signal, representing a structure-borne noise spectrum, generated by said sensor;

a processor connected to said signal conditioning circuit so as to receive a signal generated by said signal conditioning circuit; and a memory connected to said processor and storring a structure-borne noise spectrum, wherein a signal recorded when an intact valve is slightly open is stored in said memory as the structure-borne noise spectrum, wherein said processor is programmed to compare the signal generated by said signal conditioning circuit with the structure-borne noise spectrum stored in said memory, and further wherein said processor is programmed to utilize a substantial similarity between the structure-borne noise spectrum from said sensor and the structure-borne noise spectrum stored in said memory, at least as one criterion for evaluating leakage of the valve.

14. A diagnostic system according to claim 13, wherein a signal recorded when an intact valve is closed is stored in said memory as the structure-borne noise spectrum, and further wherein said processor is programmed to utilize a substantial similarity between the structure-borne noise spectrum for the valve from said sensor and the structure-borne noise spectrum stored in said memory, at least as one criterion for evaluating intactness of the valve.

15. A diagnostic system according to claim 13, wherein a signal that is recorded for a defined valve position is stored in said memory as the structure-borne noise spectrum, further wherein an additional structure-borne noise spectrum in a different valve position is sensed by said sensor, and further wherein said processor is programmed to remove from the recorded structure-borne noise spectrum corresponding spectral components of the additional structure-borne noise spectrum.

\* \* \* \* \*